E. H. JACKSON.
DOUGH MIXING APPARATUS.
APPLICATION FILED OCT. 30, 1916.
1,241,390.
Patented Sept. 25, 1917.
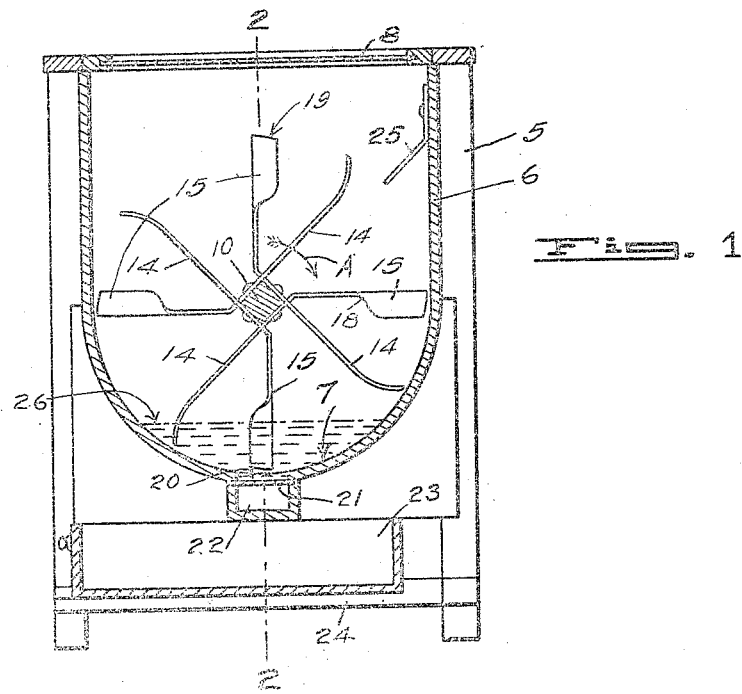
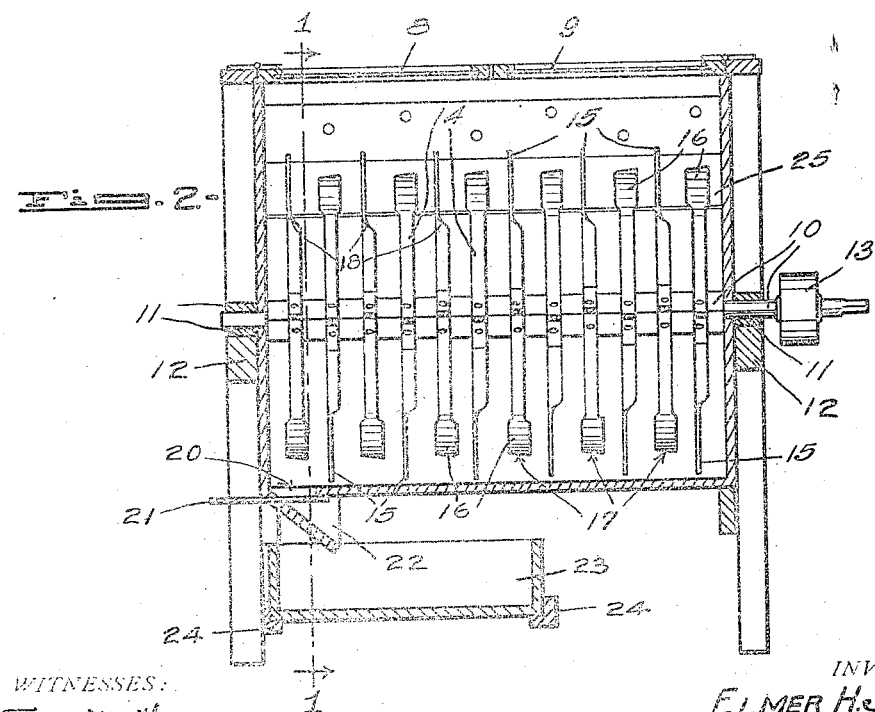
WITNESSES:
INVENTOR.
ELMER H. JACKSON.
BY Cook & Matheny
ATTORNEY.

UNITED STATES PATENT OFFICE.

ELMER H. JACKSON, OF SEATTLE, WASHINGTON.

DOUGH-MIXING APPARATUS.

1,241,390.      Specification of Letters Patent.      Patented Sept. 25, 1917.

Application filed October 30, 1916. Serial No. 128,799.

*To all whom it may concern:*

Be it known that I, ELMER H. JACKSON, a citizen of the United States, residing at Seattle, in the county of King and State of Washington, have invented new and useful Improvements in Dough-Mixing Apparatus, of which the following is a specification.

This invention relates to improvements in machines for mixing dough and the object of this improvement is to provide a machine of strong, cheap, and simple form of construction that is adapted for mixing dough, as pie dough, wherein lard or shortening grease of any kind must be thoroughly mixed with flour preparatory to baking.

The invention consists in the novel construction, adaptation, and combination of parts as will be more clearly described in the following specification, illustrated in the accompanying drawings, and finally pointed out in the appended claims.

In the accompanying drawings, Figure 1 is a view in vertical cross section of a device embodying this invention substantially on broken line 1, 1 of Fig. 2, and Fig. 2 is a view in longitudinal vertical cross section substantially on broken line 2, 2 of Fig. 1.

Referring to the drawings throughout which like reference numerals indicate like parts, the numeral 5 indicates a frame that supports a U-shaped receptacle 6 having an arcuate bottom portion 7 and an open top end adapted to be closed by suitable hinged doors 8 and 9.

Extending lengthwise of the receptacle 6 is an axially disposed shaft 10 that projects outwardly through the end walls of the casing 6 and is journaled in bearings 11 secured to cross pieces 12 on the frame, the shaft 10 being provided on one end with a pulley 13 that may be connected with a power-driven belt (not shown).

That portion of the shaft 10 within the receptacle 6 is preferably square in cross section and has secured thereto at frequent intervals, radially disposed paddles 14 and radially disposed knife blades 15, the paddles being offset so that as the shaft rotates no two paddles will follow in the same path and the knives being arranged to follow in the path of the paddles to cut up and pulverize the dough.

The paddles are formed of flat strips of relatively stiff material and are curved at their outer ends, as at 16, in a direction opposite to the direction of rotation of the shaft 10.

The end 17 of each paddle is also formed at an angle that is inclined toward the axis of rotation from intake to discharge end of the machine for the purpose of gradually advancing the dough toward the discharge end of the machine.

The blades 15 are formed of flat pieces of relatively thin stiff material secured to the shaft 10 and twisted as at 18 through an angle of ninety degrees so that the outer ends of the blades present a cutting edge in the direction of their movement.

The outer ends 19 of the blades 15 are cut at a slight angle so that the front corners thereof are slightly farther away from the walls of the receptacle 6 than the rear corners are as the device is rotated.

20 is a discharge opening located at one end of the mixer and adapted to be closed by a slidable plate 21, and 22 is a chute adapted to direct mixed dough from the receptacle 6 into a drawer or receiving vessel 23 preferably supported in guides 24 on the frame 5.

25 is a thin plate secured to the upper wall of the receptacle 6 to project outwardly therefrom at an angle thereto and terminates at a point near the path of movement of the ends of the paddles 14 and blades 15 to knock loose any chunks of dough that may stick to the ends of the paddles or blades and be carried around thereby.

When pie dough is to be mixed, dry flour and lard or similar shortening material is placed in the bottom of the receptacle 6 to substantially the depth indicated by broken line 26 Fig. 1, and the shaft 10 carrying blades 15 and paddles 14 is then rotated in the direction indicated by the arrow A.

As the paddles are rotated the curved outer ends thereof pass through the flour and lard, each paddle passing close to the curved bottom 7 and squeezing a portion of flour and lard between the end of the paddle and the bottom of the receptacle, thus thoroughly working the lard into the flour.

The knives follow the paddles and tend to cut up any chunks of lard or lard and flour that may form and the angular outer ends 17 of the paddles, by their co-action with the walls of the receptacle 6, tend to move the dough slowly toward the discharge end of the receptacle.

When the first batch of dough is well mixed it may be gradually removed by opening the slide 21 so that the mixed dough will be discharged into the drawer 23, fresh material being introduced at the end of the receptacle 6 opposite the discharge opening 20 from time to time as the mixed dough is taken off, thus making a continuous process, the mixing apparatus being continually rotated and the materials being introduced at one end of the machine and being thoroughly mixed by the time they have reached the discharge opening 20.

With this machine it is possible to mix the lard and flour very efficiently, the action of the curved paddles 14, as they squeeze the dough past the ends thereof, working the lard into the flour very thoroughly so that a high quality of pie dough is secured.

Obviously changes in the form of construction of this device may be resorted to within the scope of the following claims.

What I claim and desire to protect by Letters Patent is:—

1. A dough mixer of the class described comprising a casing having an arcuate bottom, an axially disposed shaft in said casing, means for rotating said shaft, and outwardly projecting paddles secured to said shaft said paddles having curved outer portions in a direction opposite to the direction of rotation of said shaft and angularly formed ends disposed to slightly clear the arcuate walls of said casing and gradually work dough toward one end of said casing when said shaft is rotated.

2. A dough mixer of the class described, comprising a casing having an arcuate bottom, an axially disposed rotatable member, radially disposed paddles projecting at frequent intervals from said rotatable member, said paddles having curved outer portions in a direction opposite to the direction of rotation of said shaft and angularly formed ends adapted to slightly clear the arcuate walls of said casing and knife blades projecting outwardly from said rotatable member into close proximity to said casing.

3. A dough mixer of the class described comprising a casing having an arcuate dough receptacle, an axially disposed shaft in said receptacle, paddles having uncurved angled ends secured to said shaft to project outwardly therefrom, knife blades secured to said shaft alternating knife blades projecting outwardly from said shaft into close proximity to said casing, to project outwardly therefrom and a deflector plate in the top portion of said casing to remove dough that may be carried around by said paddles and said knives.

ELMER H. JACKSON.

Copies of this patent may be obtained for five cents each, by addressing the "Commissioner of Patents, Washington, D. C."